US011142165B2

(12) United States Patent
Flick (10) Patent No.: US 11,142,165 B2
(45) Date of Patent: Oct. 12, 2021

(54) VEHICLE SYSTEM INCLUDING REMOTE START DATA BUS COMMAND SENDING BASED UPON A SHORT-RANGE LINK AND RELATED METHODS

(71) Applicant: OMEGA PATENTS, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 314 days.

(21) Appl. No.: 16/242,761

(22) Filed: Jan. 8, 2019

(65) Prior Publication Data
US 2019/0143935 A1     May 16, 2019

Related U.S. Application Data

(63) Continuation-in-part of application No. 15/241,596, filed on Aug. 19, 2016, now Pat. No. 10,180,689.

(51) Int. Cl.
*B60R 25/20*     (2013.01)
*G07C 5/00*      (2006.01)
(Continued)

(52) U.S. Cl.
CPC ............ *B60R 25/209* (2013.01); *B60R 25/33* (2013.01); *G06F 13/42* (2013.01); *G07C 5/008* (2013.01);
(Continued)

(58) Field of Classification Search
CPC . B60R 25/209; B60R 25/33; B60R 2325/101; G07C 5/0816; G07C 5/008;
(Continued)

(56) References Cited

U.S. PATENT DOCUMENTS 4,055,772 A    10/1977  Leung
4,383,242 A     5/1983  Sassover et al.
(Continued)

OTHER PUBLICATIONS

Mark Thompson "The Thick and Thin of Car Cabling" by Thompson appealing in the IEEE Spectrum, Feb. 1996, pp. 42-45.
(Continued)

*Primary Examiner* — Alan D Hutchinson
(74) *Attorney, Agent, or Firm* — Allen, Dyer, Doppelt + Gilchrist, P.A.

(57) ABSTRACT

A vehicle system for a vehicle may include a vehicle tracking unit that includes a first bus interface to be coupled to a first data communications bus of the vehicle, a vehicle position determining device, long-range and short-ranges tracker wireless devices, and a tracker controller to send vehicle position information via the long-range tracker wireless device based upon the vehicle positioning determining device. The system may also include a remote start unit that includes a second bus interface to be coupled to a second data communications bus of the vehicle, a short-range remote start wireless device to establish a short-range wireless link with the short-range tracker wireless device, and a remote start controller to receive a remote start command from the long-range tracker wireless device via the short-range wireless link, and send a remote start data bus command onto the second data communications bus based upon the remote start command.

28 Claims, 7 Drawing Sheets

(51) Int. Cl.

| | | |
|---|---|---|
| *G07C 5/08* | (2006.01) | |
| *G06F 13/42* | (2006.01) | |
| *H04L 12/40* | (2006.01) | |
| *H04W 4/48* | (2018.01) | |
| *H04W 4/80* | (2018.01) | |
| *H04W 4/029* | (2018.01) | |
| *B60R 25/33* | (2013.01) | |
| *H04L 12/46* | (2006.01) | |
| *H04W 4/02* | (2018.01) | |
| *H04L 29/08* | (2006.01) | |
| *G06F 13/40* | (2006.01) | |

(52) U.S. Cl.
CPC ............ *G07C 5/08* (2013.01); *G07C 5/0816* (2013.01); *H04L 12/40006* (2013.01); *H04L 12/40045* (2013.01); *H04L 12/4625* (2013.01); *H04W 4/029* (2018.02); *H04W 4/48* (2018.02); *H04W 4/80* (2018.02); *B60R 2325/101* (2013.01); *G06F 13/4027* (2013.01); *G06F 2213/40* (2013.01); *H04L 67/125* (2013.01); *H04L 2012/40273* (2013.01); *H04W 4/02* (2013.01)

(58) Field of Classification Search
CPC . G07C 5/08; H04L 12/4625; H04L 12/40006; H04L 12/40045; H04L 67/125; H04L 2012/40273; G06F 13/42; G06F 13/4027; G06F 2213/40; H04W 4/48; H04W 4/80; H04W 4/029; H04W 4/02
See application file for complete search history.

(56) References Cited

U.S. PATENT DOCUMENTS

| | | |
|---|---|---|
| 4,538,262 A | 8/1985 | Sinniger et al. |
| 4,697,092 A | 9/1987 | Roggendorf et al. |
| 4,760,275 A | 7/1988 | Sato et al. |
| 4,792,783 A | 12/1988 | Burgess et al. |
| 5,146,215 A | 9/1992 | Drori |
| 5,252,966 A | 10/1993 | Lambropoulos et al. |
| 6,011,460 A | 1/2000 | Flick |
| 8,032,278 B2 | 10/2011 | Flick |
| 9,140,228 B2 | 9/2015 | Flick |
| 9,656,631 B1 | 5/2017 | Flick |
| 2009/0109039 A1 | 4/2009 | Kellzi et al. |
| 2014/0277838 A1 | 9/2014 | Flick |
| 2015/0246658 A1 | 9/2015 | Flick |
| 2015/0291109 A1 | 10/2015 | Flick |
| 2015/0309949 A1 | 10/2015 | Bettencourt et al. |
| 2017/0101007 A1 | 4/2017 | Devries et al. |
| 2017/0197585 A1 | 7/2017 | Izraeli et al. |
| 2017/0197587 A1 | 7/2017 | Flick |
| 2017/0197588 A1 | 7/2017 | Flick |
| 2017/0259786 A1* | 9/2017 | Burgkhardt ............. B60R 25/01 |
| 2017/0309085 A1* | 10/2017 | Elliott .................... H04L 67/12 |
| 2018/0050660 A1 | 2/2018 | Flick |

OTHER PUBLICATIONS

"Surface Vehicle Standard, Class B Data Communications Network Interface", SAE J1850, Jul. 1995; pp. 1-52.
"Surface Vehicle Information Report, Chrysler Sensor and Control (CSC) Bus Multiplexing Network for Class 'A' Applications", SAE J2058, Jul. 1990.; pp. 1-26.

\* cited by examiner

VEHICLE SYSTEM INCLUDING REMOTE START DATA BUS COMMAND SENDING BASED UPON A SHORT-RANGE LINK AND RELATED METHODS

RELATED APPLICATION

This application is a continuation-in-part of U.S. patent application Ser. No. 15/241,596, filed on Aug. 19, 2016, the entire contents of which are herein incorporated by reference.

TECHNICAL FIELD

The present invention relates to the field of vehicle control systems and, more particularly, to a remote function control system and related methods for vehicles.

BACKGROUND

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function, U.S. Pat. No. 5,252,966 to Lambropoulous et al. discloses a remote keyless entry, system for a vehicle. The keyless entry system permits the user to remotely open the vehicle doors or open the vehicle trunk using a small handheld transmitter.

Unfortunately, many vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42-45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle control systems, such as aftermarket vehicle security systems, are for hardwired connection to vehicle devices and are not readily adaptable to a vehicle including a data communications bus. Moreover, a vehicle security system if adapted for a communications bus and devices for one particular model, model year, and manufacturer, may not be compatible with any other models, model years, or manufacturers. Other systems for the control of vehicle functions may also suffer from such shortcomings.

One approach to addressing these shortcomings is described in U.S. Pat. No. 6,011,460 to Flick which discloses a multi-vehicle security system. More particularly, the Flick '460 patent discloses a desired signal enabling circuit electrically coupled to the data communications bus for enabling an alarm controller to operate using a set of desired signals for a desired vehicle from among a plurality of possible sets of signals for different vehicles. Thus, the desired signal enabling circuit permits the alarm controller to communicate with a vehicle security sensor and an alarm indicator via the data communications bus so that the alarm controller is capable of operating the alarm indicator responsive to the vehicle security sensor. The desired signal enabling circuit may learn the desired set of signals from the plurality of different sets of signals for different vehicles by connection and communications with a downloading device, such as a portable or laptop computer.

However, still further improvements for remote control device operation of vehicle devices, for example, a security system, remote start system, etc., may be desired. In particular, it may be desirable to more easily configure or adapt a wider range of vehicle devices to be operated from a remote control device.

SUMMARY

A vehicle system for a vehicle that includes first and second data communications busses may include a vehicle tracking unit that may include a first bus interface to be coupled to the first data communications bus, a vehicle position determining device, and a long-range tracker wireless device. The first bus interface may also include a short-range tracker wireless device having a shorter operating range than the long-range tracker wireless device, and a tracker controller coupled to the first bus interface, the vehicle position determining device, the long-range tracker wireless device, and the short-range tracker wireless device. The tracker controller may be configured to send vehicle position information via the long-range tracker wireless device based upon the vehicle positioning determining device. The vehicle system may also include a remote start unit that may include a second bus interface to be coupled to the second data communications bus and a short-range remote start wireless device configured to establish a short-range wireless link with the short-range tracker wireless device. The remote start unit may also include a remote start controller coupled to the second bus interface and the short-range remote start wireless device and configured to receive a remote start command from the long-range tracker wireless device via the short-range wireless link, and send at least one remote start data bus command onto the second data communications bus via the second bus interface based upon the remote start command.

The first bus interface may include an OBD connector, for example. The tracker controller may be configured to collect vehicle status data via the first bus interface, and send the vehicle status data via the long-range tracker wireless device. The vehicle tracking unit may be configured to obtain power via the first bus interface, for example.

The remote start unit may include a first housing carrying the short-range remote start wireless device, and a second housing carrying the remote start controller. The first housing may also carry the second bus interface, for example. The second housing may also carry the second bus interface, for example. The vehicle system may include a first connector portion carried by the first housing, and a second connector portion carried by the second housing.

The remote start unit may include a common housing carrying the second bus interface, the short-range remote start wireless device, and the remote start controller, for example. The long-range tracker wireless device may include a tracker cellular wireless device, for example.

The short-range tracker wireless device may include a tracker Bluetooth wireless device, and the short-range remote start wireless device comprises a remote start Bluetooth device, for example. The short-range remote start wireless device may include a remote start Bluetooth wireless device, for example.

The vehicle tracking unit may include a back-up battery for the first bus interface, the position determining device, the long-range tracker wireless device, the short-range tracker wireless device, and the tracker controller. The first data communications bus may include a low-speed data communications bus, and the second data communications bus may include a high-speed data communications bus and a having a speed higher than the low-speed data communications bus.

A method aspect is directed to a remote start method for a vehicle that includes first and second data communications busses. The method may include, at a vehicle tracking unit that includes a first bus interface to be coupled to the first data communications bus, a vehicle position determining device, a long-range tracker wireless device, a short-range tracker wireless device having a shorter operating range than the long-range tracker wireless device, and a tracker controller coupled to the first bus interface, the vehicle position determining device, the long-range tracker wireless device, and the short-range tracker wireless device, sending vehicle position information via the long-range tracker wireless device based upon the vehicle positioning determining device. The method may also include, at a remote start unit comprising a second bus interface to be coupled to the second data communications bus, a short-range remote start wireless device configured to establish a short-range wireless link with the short-range tracker wireless device, and a remote start controller coupled to the second bus interface and the short-range remote start wireless device, receiving a remote start command from the long-range tracker wireless device via the short-range wireless link and sending at least one remote start data bus command onto the second data communications bus via the second bus interface based upon the remote start command.

DETAILED DESCRIPTION

This disclosure is provided with reference to the accompanying drawings, in which various example embodiments are shown. However, other embodiments and different forms may be used, and the disclosure should not be construed as limited to the example embodiments set forth herein. Rather, these example embodiments are provided so that this disclosure will be thorough and complete. Like numbers refer to like elements throughout, and prime and multiple prime notations are used to indicate similar elements in alternative embodiments.

Figure 1:
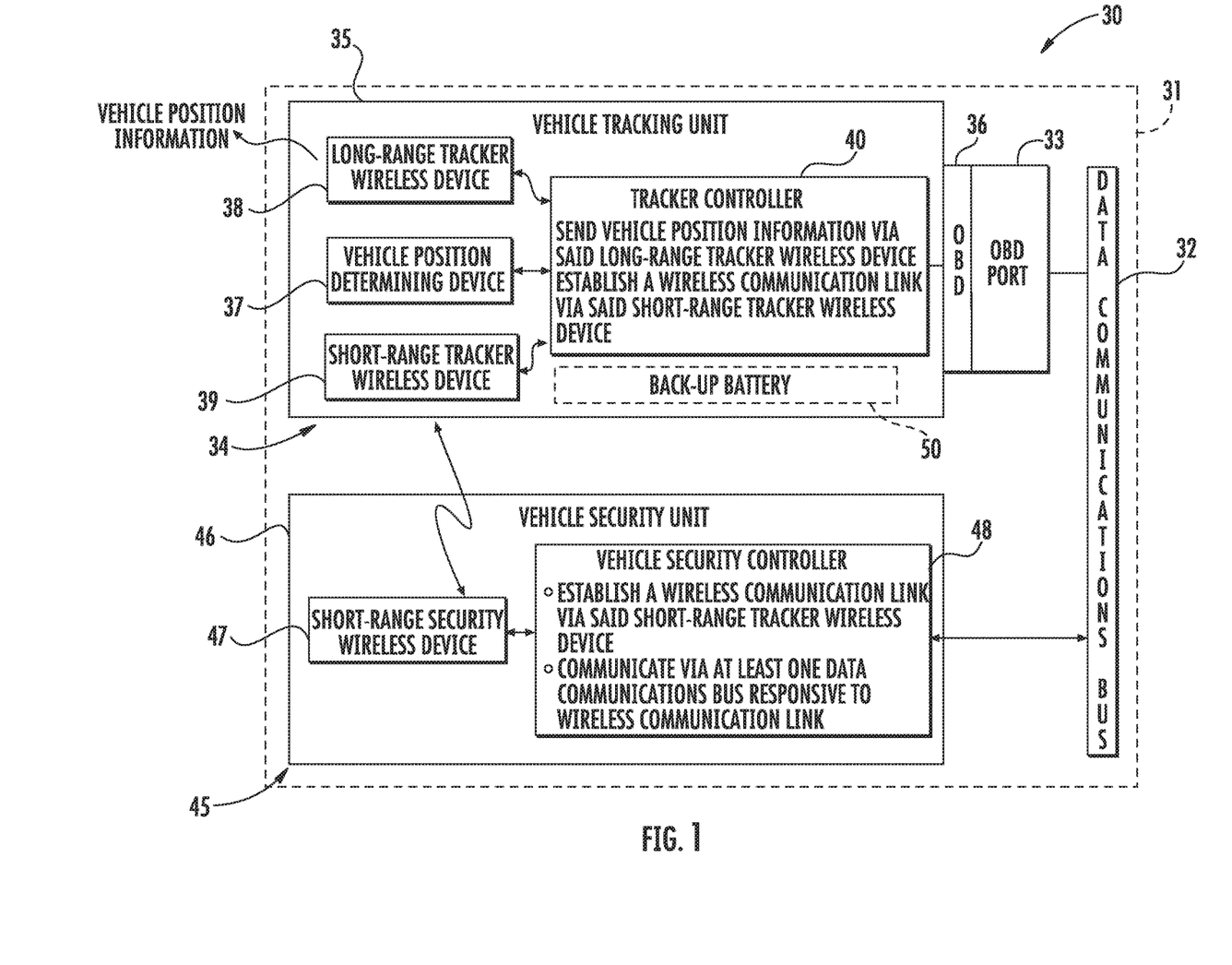
FIG. 1 is a schematic block diagram of a vehicle system in accordance with an example embodiment.

Referring initially to FIG. 1, a vehicle system 30 is for a vehicle 31 illustratively including one or more data communications busses 32, and an On-Board Diagnostic (OBD) port 33 coupled to the data communications bus. The vehicle system 30 illustratively includes a vehicle tracking unit 34 including a tracker housing 35, an OBD connector 36 to be removably coupled to the OBD port, and a vehicle position determining device 37 carried by the tracker housing. The OBD connector 36 may be directly carried by the tracker housing 30, or coupled by a pigtail cable, as will be appreciated by those skilled in the art. By way of example, the vehicle position determining device may include a GPS receiver, although other position determining devices may also be used.

The vehicle system 30 further illustratively includes a long-range tracker wireless device 38 carried by the tracker housing 35, and a short-range tracker wireless device 39 carried by the tracker housing and having a shorter operating range than the long-range tracker wireless device. By way of example, the long-range tracker wireless device 38 may be a cellular device. In accordance with another example implementation, the long-range tracker wireless device 38 may be a wireless local area network (WLAN) device which communicates with a WLAN access point when in range thereof (e.g., when the vehicle 31 is at a home location). The short-range tracker wireless device 39 may be a Bluetooth® device (i.e., using short-wavelength UHF radio waves in the ISM band from 2.4 to 2.485 GHz), although WLAN or other suitable short-range communications formats may also be used in different embodiments. For example, the short-range tracker wireless device 39 may be used to communicate vehicle diagnostic information to the vehicle owner's cellphone.

The vehicle tracking unit 34 further illustratively includes a tracker controller 40 carried by the tracker housing 35 and coupled to the OBD connector 36. By way of example, the tracker controller 40 may be implemented using hardware (e.g., a microprocessor) and associated non-transitory computer-readable medium having computer-executable instructions for causing the hardware to perform the various operations described herein. More particularly, the tracker controller 40 may be configured to send vehicle position information via the long-range tracker wireless device to a user or monitoring system, for example. By way of example, this information may be sent to parents, insurance companies, and corporations to monitor children, insurance policy holders, and employees, respectively. That is, such information may be used to determine the places the vehicle 31 travels to, as well as the speed at which it travels, and speed exceeded notifications. In some embodiments, additional information may also be communicated via the long-range tracker wireless device 38, such as vehicle diagnostic or health information, for example.

The system 30 further illustratively includes a vehicle security unit 45 including a security unit housing 46, a short-range security wireless device 47 carried by the security unit housing, and a vehicle security controller 48 carried by the security unit housing. The short-range security wireless device 47 may operate using the same communications format as the short-range tracker wireless device 39 (e.g., Bluetooth® format, etc.).

Figure 3:
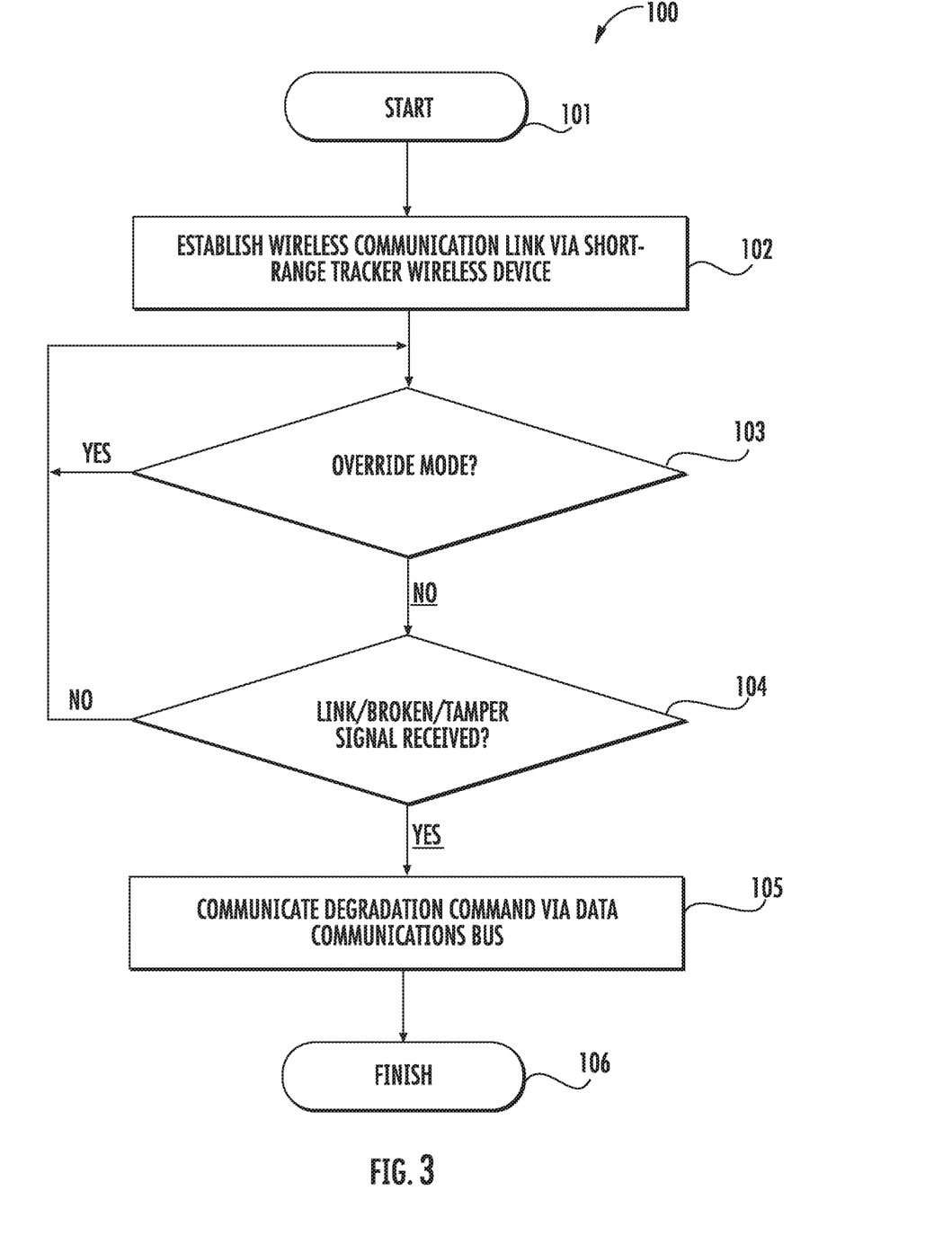
FIG. 3 is a flow diagram illustrating method aspects associated with the system of FIG. 1.

Operation of the system 30 and vehicle security unit 45 is now described further with reference to the flow diagram 100 of FIG. 3. Beginning at Block 101, the tracker controller 40 and vehicle security controller 48 may establish a wireless communication link (e.g., a Bluetooth® link) via the short-range tracker wireless device 39 and the short-range security wireless device 47, at Block 102. More particularly, the wireless communication link is used to convey to the vehicle security unit 45 that the vehicle tracking unit is still installed in the vehicle 31 and functioning properly, which the vehicle security controller 48 monitors when in a normal (e.g., armed) operating mode. However, it should be noted that the vehicle security controller 48 may optionally be placed in an override (disarmed) mode (Block 103), e.g., by the owner of the vehicle 31 when he or she is in the vehicle. This may be done in various ways, such as by operation of a vehicle device. For example, a local input device may be within the vehicle, such as a keypad, touch screen, etc., to cause the vehicle security controller 48 to enter the override mode. Another approach is by interfacing with a mobile wireless communications device, such as a user's smart phone, via the short-range security wireless device 47 to switch between the override and normal modes, for example.

One approach by which the wireless communication link may be used to inform the vehicle security unit 45 that the vehicle tracking unit is still installed in the vehicle 31 and functioning properly is based upon the wireless communication link not being broken (Block 104). That is, the vehicle security unit 45 will know that the vehicle tracking unit 34 is plugged into the OBD port 33 and functioning properly so long as the wireless communication link is established. More specifically, if the wireless communication link is broken, this may indicate that the vehicle tracking unit 34 has been unplugged from the OBD port 33 and is accordingly no longer receiving power from the OBD port. For the Bluetooth® example, as long as the devices remain paired, the security controller 48 will be able to determine the tracking unit 34 is still in the vehicle and operational. For example, this might be the case if a child, employee, or thief unplugs the vehicle tracking unit 34 from the OBD port 33 to hide the location of the vehicle 31 or the speed at which it is traveling.

In some embodiments, the vehicle tracking unit 34 may optionally include a back-up battery 50 to provide power to the tracker controller 40, long and short-range tracker wireless devices 38, 39, and the vehicle position determining device 37 if power from the OBD port is lost, such as if the vehicle tracking unit is unplugged from the OBD port. In this case, the short-range tracker wireless device may still maintain the wireless communication link with the short-range security device 47 based upon back-up power, but the vehicle security unit 45 may still need to take appropriate action based upon the security event which has occurred (e.g., unplugging of the vehicle tracking unit 34 from the OBD port 33). As such, the tracker controller 40 may advantageously send a tamper signal to the vehicle security controller 48 via the wireless communication link, indicating that a security event has occurred with the vehicle tracking unit 34 (e.g., it has been unplugged). In some embodiments, the vehicle security controller 48 may look to either a broken wireless communication link or a tamper signal as an indicator that a security event has occurred with the vehicle tracking unit 34 which requires communicating over the data communications bus 32 to control one or more vehicle operations in response to the security event (Block 105). The method of FIG. 3 illustratively concludes at Block 106.

A related vehicle security method may include, at the vehicle tracking unit 34, sending vehicle position information via the long-range tracker wireless device 38 and establishing a wireless communication link via the short-range tracker wireless device 39, as noted above. The method may further include, at the vehicle security unit 45 establishing the wireless communication link via the short-range security wireless device 47 with the short-range tracker wireless device 39 and communicating via the at least one data communications bus 32 responsive to the wireless communication link, as also noted above.

Figure 2:
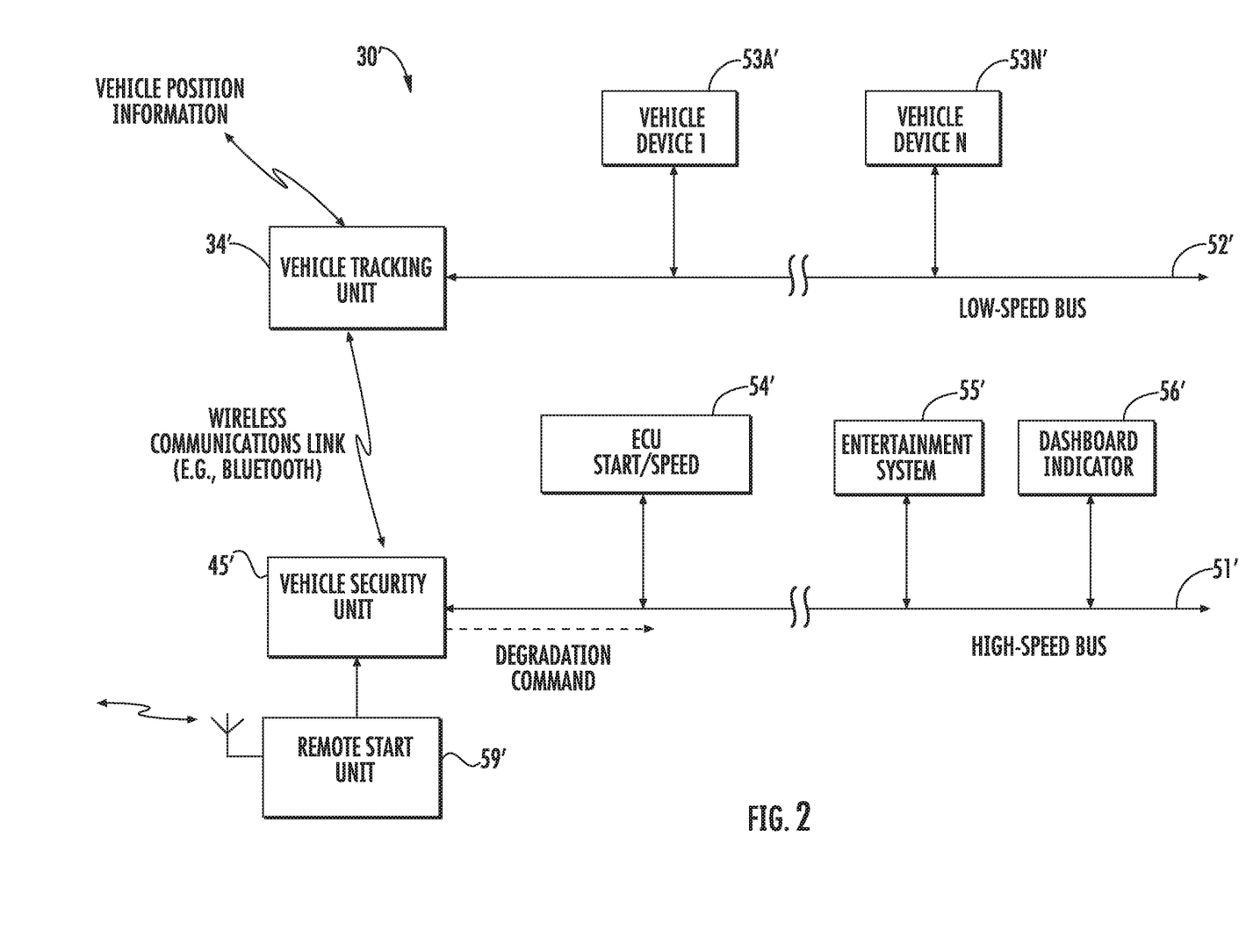
FIG. 2 is a schematic block diagram of an example implementation of the vehicle system of FIG. 1.

Turning additionally to FIG. 2, an example implementation of another embodiment of the system 30' is now described in which the vehicle includes multiple data busses, in particular a high-speed data bus 51' and a low-speed data bus 52' having a speed lower than the high-speed data bus. In the illustrated example, the vehicle tracking unit 34' is coupled to the low-speed data communications bus 52', and the vehicle security unit 45' is coupled to the high-speed data communications bus 51'. By way of example, the different types of data busses may include Controller Area Network (CAN) busses, Local Interconnect Network (LIN) busses, etc.

Furthermore, the slow-speed and high-speed data busses 51', 52' are each coupled to a plurality of respective vehicle devices. In the illustrated example, the low-speed bus 52' is connected to a plurality of vehicle devices 53a'-53n', while the high-speed data bus is connected to the vehicle's electronic control unit (ECU) 54', an entertainment/media system 55', and a dashboard indicator 56'. More particularly, responsive to determining a security event with the vehicle tracking unit as noted above, the vehicle security controller 48' may be configured to communicate a vehicle degradation command to one or more of these devices via the high-speed bus 51'. In accordance with one example, the vehicle degradation command may be in the form of an engine start blocking command and/or a vehicle speed slow command to the ECU 54', causing the ECU to prevent starting of the vehicle or to govern the speed to a desired limit, for example. The vehicle security unit 45' may be optionally coupled to a remote start unit 59', and have multi-vehicle capability so that the remote start unit can interface with different vehicles, as disclosed in U.S. Pat. Nos. 6,011,460 and 8,032,278, for example, the entire contents of which are hereby incorporated herein by reference. Of course, remote start capability could also be included within the vehicle security unit 45' as well.

In accordance with another example embodiment, the vehicle degradation command may take the form of an entertainment system volume change command to the entertainment system 55', causing it to reduce or shut off the volume of a stereo, etc. Still another vehicle degradation command may take the form of a dashboard indicator change command to the dashboard indicator 56', such as to cause a warning indication (e.g., flashing light or image, warning message, etc.) via a heads-up display, navigation screen, or dashboard light(s), for example. Of course, other devices may also be coupled to the high-speed bus 51' (e.g., Transmission Control Unit (TCU), Antilock Braking System (ABS), body control module (BCM), etc.) and vehicle degradation commands similarly sent thereto in different embodiments. Moreover, multiple vehicle degradation commands may be sent to different devices responsive to the same security event (e.g., the vehicle 31 may be slowed and the dashboard lights flashed at the same time).

Figure 4:
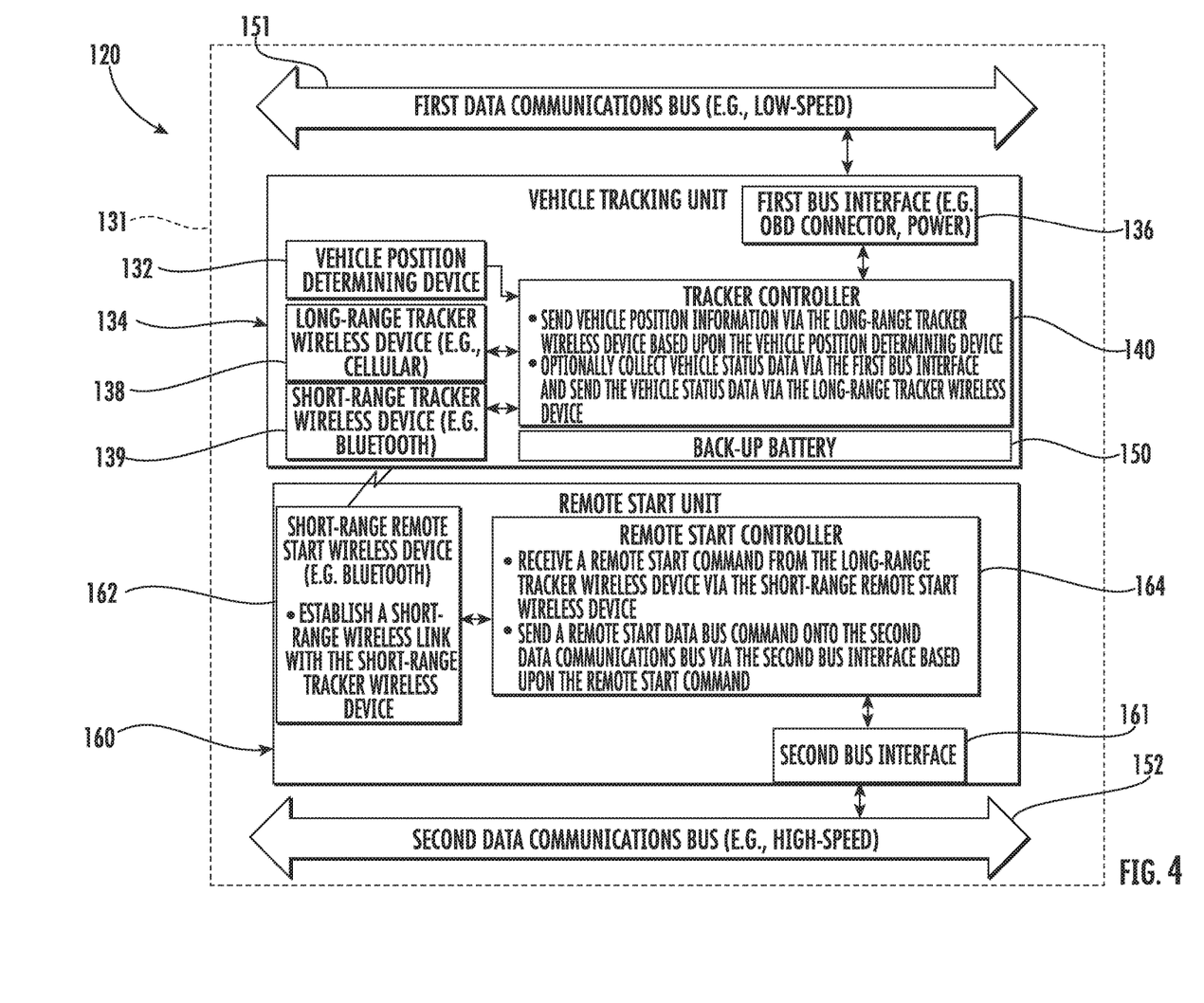
FIG. 4 is a schematic block diagram of a vehicle system in accordance with another embodiment.

Referring now to FIG. 4, in another embodiment, a vehicle system 120 is for a vehicle 131 that includes first and second data communications busses 151, 152. The first data communications bus 151 may be a low-speed data communications bus, and the second data communications bus 152 may be a high-speed data communications bus. The high-speed data communications bus 152 has a higher speed than the low-speed data communications bus 151. For example, the first and second data communications busses 151, 152 may include Controller Area Network (CAN) busses, Local Interconnect Network (LIN) busses, etc.

The vehicle system 120 illustratively includes a vehicle tracking unit 134 that includes a tracker housing 135 and a first bus interface 136 to be coupled to the first data communications bus 151. The first bus interface 136 may be an OBD connector, for example, for coupling to an OBD port associated with the first data communications bus 151. The first bus interface 136 may be another type of connector or interface. The vehicle tracking unit 134 may advantageously obtain power via the first bus interface 136. Of course, in some embodiments, the vehicle tracking unit 134 may obtain power from another power source, such as, for example, a battery.

The vehicle tracking unit 134 also includes a vehicle position determining device 137 carried by the tracker housing 135. The vehicle position determining device 137 may include a GPS receiver, for example. The vehicle position determining device 137 may include other and/or additional devices for determining the geographic position of the vehicle 131.

The vehicle tracking unit 134 also includes a long-range tracker wireless device 138 carried by the tracker housing 135, and a short-range tracker wireless device 139 also carried by the tracker housing. The short-range tracker wireless device 139 has a shorter operating range than the long-range tracker wireless device 138. By way of example, the long-range tracker wireless device 138 may be a cellular device. In accordance with another example implementation, the long-range tracker wireless device 138 may be a wireless local area network (WLAN) device which communicates with a WLAN access point when in range thereof (e.g., when the vehicle 131 is at a home location). The short-range tracker wireless device 139 may be a Bluetooth® device (i.e., using short-wavelength UHF radio waves in the ISM band from 2.4 to 2.485 GHz), although WLAN or other suitable short-range communications formats may also be used in different embodiments. For example, the short-range tracker wireless device 139 may be used to communicate vehicle diagnostic information to the vehicle owner's cellphone.

The vehicle tracking unit 134 further illustratively includes a tracker controller 140 carried by the tracker housing 135 and coupled to the first bus interface 136 (e.g. an OBD connector), the vehicle position determining device 137, and the short- and long-range tracker wireless devices 139, 138. For example, the tracker controller 140 may be implemented using hardware (e.g., a microprocessor) and associated non-transitory computer-readable medium having computer-executable instructions for causing the hardware to perform the various operations described herein. The tracker controller 140 sends vehicle position information via the long-range tracker wireless device 138. The vehicle position information may be sent to a user or monitoring system, for example, based upon the vehicle position determining device 137. The tracker controller 140 may also collect vehicle status data via the first bus interface 136 (e.g., speed, acceleration, etc.) and send the vehicle status data via the long-range tracker wireless device 138. For example, the vehicle position information may be sent to parents, insurance companies, and corporations to monitor children, insurance policy holders, and employees, respectively. The vehicle position information may be used, for example, in conjunction with the vehicle status data, to determine the places the vehicle 131 travels to, as well as the speed at which it travels, and speed exceeded notifications. In some embodiments, the tracker controller 140 may collect and send other and/or additional vehicle status data via the long-range tracker wireless device 138, such as vehicle diagnostic or health information, for example.

Figure 5:
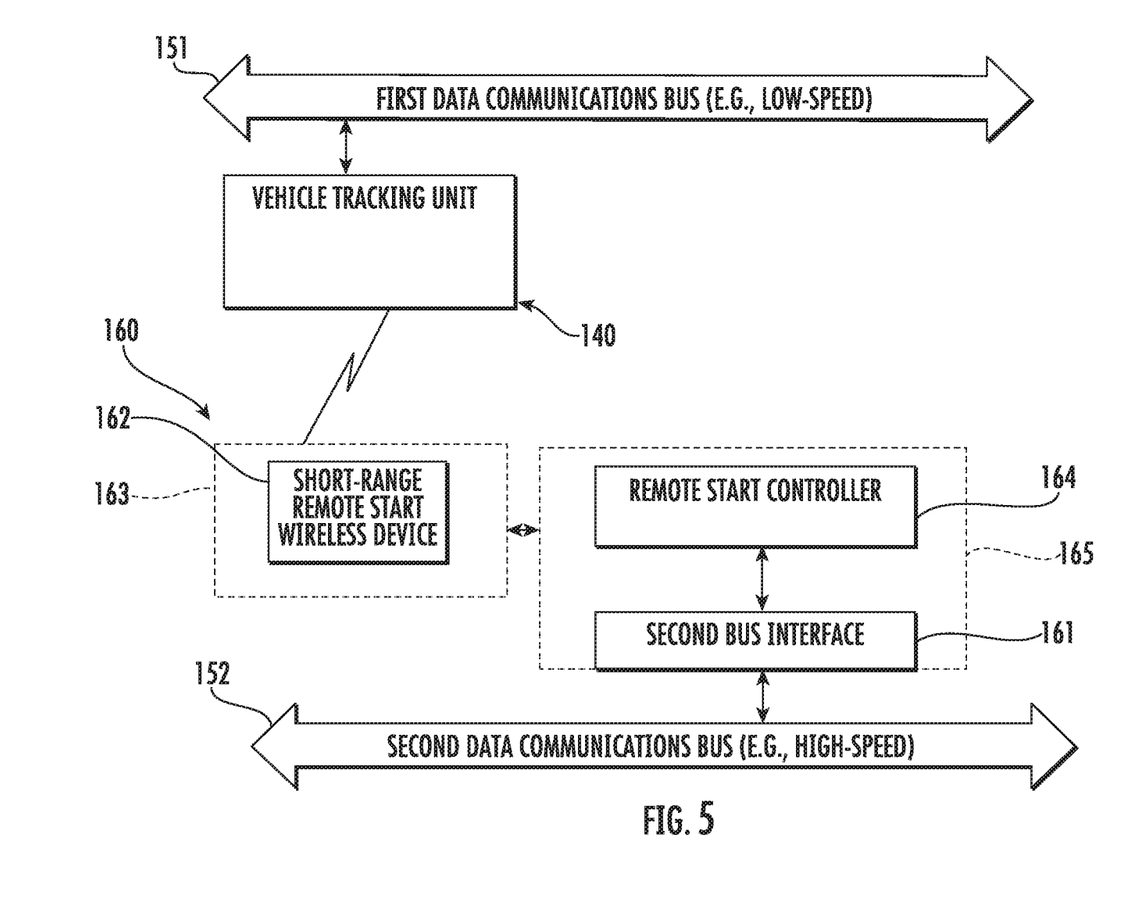
FIG. 5 is a schematic block diagram of a portion of the vehicle system of FIG. 4.

Referring additionally to FIG. 5, the vehicle system 120 also includes a remote start unit 160. The remote start unit 160 includes a short-range remote start wireless device 162 carried by a first housing 163. The short-range remote start wireless device 162 establishes a short-range wireless link with the short-range tracker wireless device 139. The short-range remote start wireless device 162 may be a Bluetooth® device, for example, when the short-range tracker wireless device 139 is also a Bluetooth® device.

The remote start unit 160 also includes a second bus interface 161 carried by a second housing 165 and that is to be coupled to the second data communications bus 152. The second bus interface 161 may be a hardwired interface with the second data communications bus 152. Of course, the second bus interface 161 may be a wireless bus interface.

The remote start unit 160 also includes a remote start controller 164 carried by the second housing 165 and coupled to the short-range wireless remote start device 162 and the second bus interface 161. The remote start controller 164 receives a remote start command from the long-range tracker wireless device 138 via the short-range wireless link. The remote start controller 164 also sends one or more remote start data bus commands onto the second data communications bus 152 via the second bus interface 161 based upon the remote start command. In some embodiments, the remote start controller 164 may also send commands onto, and/or receive status information from, the first data communications bus 151 via the short-range link, such as for starting the vehicle or other purposes. Alternatively, the remote start controller 164 may use a direct hardwire connection (not shown) to the first data communications bus 151, such as for starting the vehicle or other purposes. As will be appreciated by those skilled in the art, the vehicle system 120 provides greater flexibility for installation, for example.

In some embodiments, the vehicle tracking unit 134 may optionally include a back-up battery 150 to provide power for the first bus interface 136, the long and short-range tracker wireless devices 138, 139, the vehicle position determining device 137, and the tracker controller 140, for example, if power supplied via the first bus interface (e.g., power from the OBD port) is lost, such as if the vehicle tracking unit is unplugged from the OBD port. In this case, the short-range tracker wireless device 139 may still maintain the wireless communication link with the short-range remote start wireless device 162 based upon back-up power, but the remote start unit 160 may take action based upon power loss, for example, generate and send a notification or other action, such as those described above with respect to the security controller.

Figure 6:
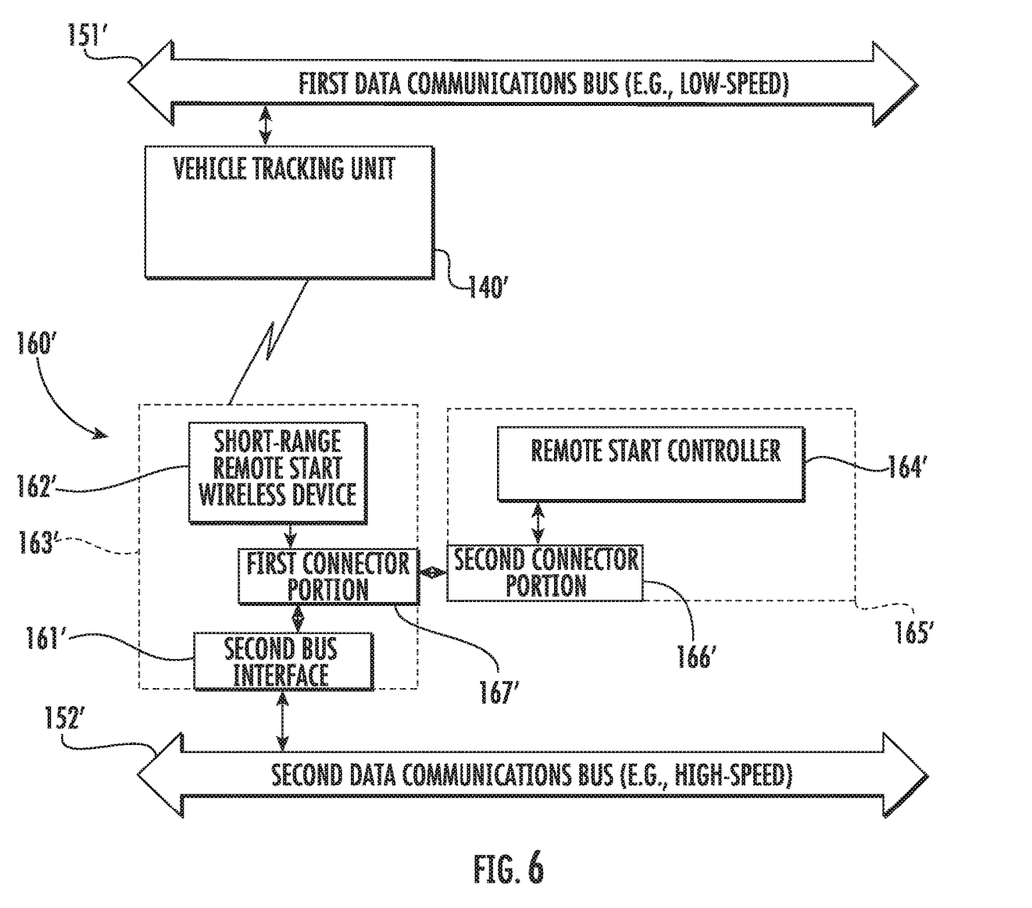
FIG. 6 is a schematic block diagram of a portion of a vehicle system in accordance with another embodiment.

Referring now to FIG. 6, in another embodiment, the second housing 165' may include a second connector portion 166', such as, for example, a physical connector, cable, etc., for coupling to a first connector portion 167' carried by the first housing 163'. The short-range remote start wireless device 162' and the second bus interface 161' are carried by the first housing 163'. In other words, the short-range remote start wireless device 162' is carried by first housing 163' instead of the second housing 165' as described above with respect to the embodiment illustrated in FIG. 4. The components carried by the first and second housings 163', 165' communicate via the first and second connector portions 167', 166'.

Figure 7:
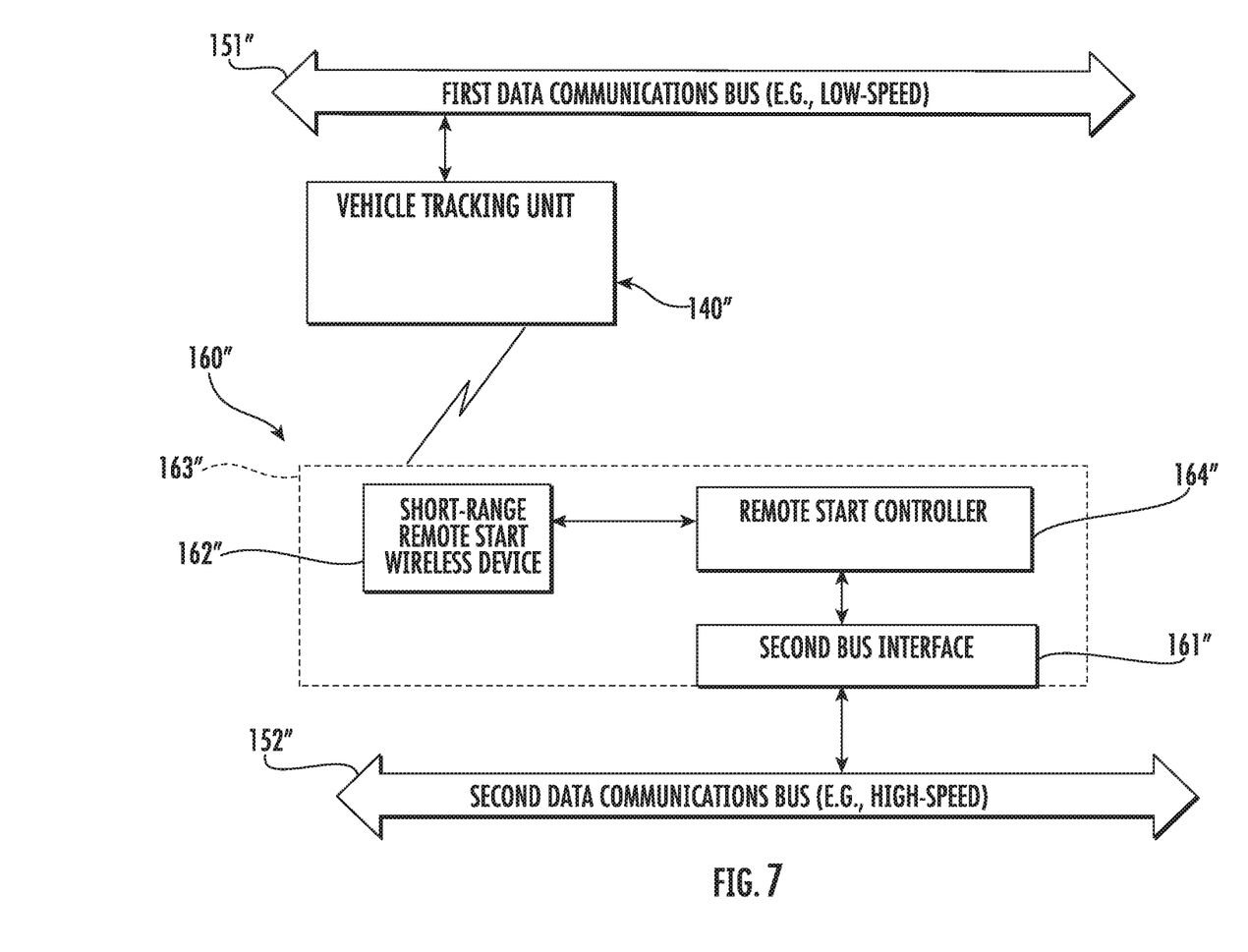
FIG. 7 is a schematic block diagram of a portion of a vehicle system in accordance with another embodiment.

Referring now to FIG. 7, in another embodiment, the remote start unit 160" includes a common housing 163" that carries the second bus interface 161", the short-range remote start wireless device 162", and the remote start controller 164". Elements illustrated but not specifically described with respect to the embodiments in FIGS. 4 and 5 are similar to the those described above and need not be further described.

A method aspect is directed to a remote start method for a vehicle 131 that includes first and second data communications busses 151, 152 and a vehicle tracking unit 134 coupled to the first data communications bus. The method includes, at the vehicle tracking unit 134 including a first bus interface 136 to be coupled to the first data communications bus 151, a vehicle position determining device 137, a long-range tracker wireless device 138, a short-range tracker wireless device 139 having a shorter operating range than the long-range tracker wireless device, and a tracker controller 140 coupled to the first bus interface, the vehicle position determining device, the long-range tracker wireless device, and the short-range tracker wireless device, sending vehicle position information via the long-range tracker wireless device based upon the vehicle positioning determining device. The method also includes, at a remote start unit 160 that includes a second bus interface 161 to be coupled to the second data communications bus 152, a short-range remote start wireless device 162 configured to establish a short-range wireless link with the short-range tracker wireless device 139, and a remote start controller 164 coupled to the second bus interface 161 and the short-range remote start wireless device 162, receiving a remote start command from the long-range tracker wireless device 138 via the short-range wireless link and sending at least one remote start data bus command onto the second data communications bus via the second bus interface based upon the remote start command.

Many modifications and other embodiments will come to the mind of one skilled in the art having the benefit of the teachings presented in the foregoing descriptions and the associated drawings. Therefore, it is understood that the disclosure is not to be limited to the specific embodiments set forth above, and that modifications and embodiments are intended to be included within the scope of the appended claims.

That which is claimed is:

1. A vehicle system for a vehicle comprising first and second data communications busses, the vehicle system comprising:
    a vehicle tracking unit comprising
        a first bus interface to be coupled to the first data communications bus,
        a vehicle position determining device,
        a long-range tracker wireless device,
        a short-range tracker wireless device having a shorter operating range than said long-range tracker wireless device, and
        a tracker controller coupled to said first bus interface, said vehicle position determining device, said long-range tracker wireless device, and said short-range tracker wireless device, said tracker controller configured to send vehicle position information via said long-range tracker wireless device based upon said vehicle positioning determining device; and a remote start unit comprising
 a second bus interface to be coupled to the second data communications bus,
 a short-range remote start wireless device configured to establish a short-range wireless link with said short-range tracker wireless device, and
 a remote start controller coupled to the second bus interface and the short-range remote start wireless device and configured to
  receive a remote start command from the long-range tracker wireless device via the short-range wireless link, and
  send at least one remote start data bus command onto the second data communications bus via the second bus interface based upon the remote start command.

2. The vehicle system of claim 1 wherein said first bus interface comprises an OBD connector.

3. The vehicle system of claim 1 wherein said tracker controller is configured to collect vehicle status data via the first bus interface, and send the vehicle status data via the long-range tracker wireless device.

4. The vehicle system of claim 1 wherein said vehicle tracking unit is configured to obtain power via the first bus interface.

5. The vehicle system of claim 1 wherein said remote start unit comprises a first housing carrying said short-range remote start wireless device, and a second housing carrying said remote start controller.

6. The vehicle system of claim 5 wherein said first housing also carries said second bus interface.

7. The vehicle system of claim 5 wherein said second housing also carries said second bus interface.

8. The vehicle system of claim 5 comprising a first connector portion carried by said first housing, and a second connector portion carried by said second housing.

9. The vehicle system of claim 1 wherein said remote start unit comprises a common housing carrying said second bus interface, said short-range remote start wireless device, and said remote start controller.

10. The vehicle system of claim 1 wherein said long-range tracker wireless device comprises a tracker cellular wireless device.

11. The vehicle system of claim 1 wherein said short-range tracker wireless device comprises a tracker Bluetooth wireless device, and said short-range remote start wireless device comprises a remote start Bluetooth device.

12. The vehicle system of claim 1 wherein said short-range remote start wireless device comprises a remote start Bluetooth wireless device.

13. The vehicle system of claim 1 wherein said vehicle tracking unit comprises a back-up battery for said first bus interface, said position determining device, said long-range tracker wireless device, said short-range tracker wireless device, and said tracker controller.

14. The vehicle system of claim 1 wherein the first data communications bus comprises a low-speed data communications bus, and the second data communications bus comprises a high-speed data communications bus and having a speed higher than the low-speed data communications bus.

15. A remote start unit for a vehicle comprising first and second data communications busses and a vehicle tracking unit coupled to the first data communications bus, the remote start unit comprising:
 a bus interface to be coupled to the second data communications bus;
 a Bluetooth remote start wireless device configured to establish a Bluetooth link with the vehicle tracking unit; and
 a remote start controller coupled to the bus interface and the Bluetooth remote start wireless device and configured to
  receive a remote start command from a long-range tracker wireless device of the vehicle tracking unit via the Bluetooth link, and
  send at least one remote start data bus command onto the second data communications bus via the second bus interface based upon the remote start command.

16. The remote start unit of claim 15 comprising a first housing carrying said Bluetooth remote start wireless device, and a second housing carrying said remote start controller.

17. The remote start unit of claim 16 wherein said first housing also carries said second bus interface.

18. The remote start unit of claim 16 wherein said second housing also carries said second bus interface.

19. The remote start unit of claim 16 comprising a first connector portion carried by said first housing, and a second connector portion carried by said second housing.

20. The remote start unit of claim 15 comprising a common housing carrying said bus interface, said Bluetooth remote start wireless device, and said remote start controller.

21. The remote start unit of claim 15 wherein the first data communications bus comprises a low-speed data communications bus, and the second data communications bus comprises a high-speed data communications bus and having a speed higher than the low-speed data communications bus.

22. A remote start method for a vehicle comprising first and second data communications busses, the method comprising:
 at a vehicle tracking unit comprising a first bus interface to be coupled to the first data communications bus, a vehicle position determining device, a long-range tracker wireless device, a short-range tracker wireless device having a shorter operating range than the long-range tracker wireless device, and a tracker controller coupled to the first bus interface, the vehicle position determining device, the long-range tracker wireless device, and the short-range tracker wireless device, sending vehicle position information via the long-range tracker wireless device based upon the vehicle positioning determining device; and
 at a remote start unit comprising a second bus interface to be coupled to the second data communications bus, a short-range remote start wireless device configured to establish a short-range wireless link with the short-range tracker wireless device, and a remote start controller coupled to the second bus interface and the short-range remote start wireless device, receiving a remote start command from the long-range tracker wireless device via the short-range wireless link and sending at least one remote start data bus command onto the second data communications bus via the second bus interface based upon the remote start command.

23. The method of claim 22 comprising, at the vehicle tracking unit, collecting vehicle status data via the first bus interface, and sending the vehicle status data via the long-range tracker wireless device.

24. The method of claim 22 comprising, at the vehicle tracking unit, obtaining power via the first bus interface.

25. The method of claim 22, wherein the remote start unit comprises a first housing carrying the short-range remote start wireless device, and a second housing carrying the remote start controller.

26. The method of claim 25 wherein the first housing also carries the second bus interface.

27. The method of claim 25 wherein the second housing also carries the second bus interface.

28. The method of claim 22 wherein the remote start unit comprises a common housing carrying the second bus interface, the short-range remote start wireless device, and the remote start controller.

\* \* \* \* \*